United States Patent
Pusch

(10) Patent No.: US 12,465,501 B2
(45) Date of Patent: Nov. 11, 2025

(54) PROSTHETIC DEVICE

(71) Applicant: Ottobock SE & Co. KGAA, Duderstadt (DE)

(72) Inventor: Martin Pusch, Duderstadt (DE)

(73) Assignee: OTTOBOCK SE & CO. KGAA, Duderstadt (DE)

( * ) Notice: Subject to any disclaimer, the term of this patent is extended or adjusted under 35 U.S.C. 154(b) by 61 days.

(21) Appl. No.: 17/416,427

(22) PCT Filed: Dec. 10, 2019

(86) PCT No.: PCT/EP2019/084495
§ 371 (c)(1),
(2) Date: Jun. 18, 2021

(87) PCT Pub. No.: WO2020/126695
PCT Pub. Date: Jun. 25, 2020

(65) Prior Publication Data
US 2022/0071779 A1 Mar. 10, 2022

(30) Foreign Application Priority Data
Dec. 20, 2018 (DE) .......................... 102018133103.7

(51) Int. Cl.
*A61F 2/64* (2006.01)
*A61F 2/50* (2006.01)
(Continued)

(52) U.S. Cl.
CPC ................. *A61F 2/64* (2013.01); *A61F 2/66* (2013.01); *A61F 2/741* (2021.08);
(Continued)

(58) Field of Classification Search
CPC .... A61F 2/64; A61F 2/66; A61F 2/741; A61F 2002/5006; A61F 2002/5039;
(Continued)

(56) References Cited

U.S. PATENT DOCUMENTS 5,181,931 A * 1/1993 van de Veen ......... A61F 5/0123
623/46
6,808,540 B1 10/2004 Gramnas
(Continued)

FOREIGN PATENT DOCUMENTS

EP 0439028 A2 10/1991
EP 2316390 A1 * 5/2011 ............... A61F 2/64
(Continued)

OTHER PUBLICATIONS

International Search Report and Written Opinion issued in PCT/EP2019/084495, dated Mar. 25, 2020, 7 pgs.

*Primary Examiner* — Christopher D. Prone
(74) *Attorney, Agent, or Firm* — HOLLAND & HART LLP

(57) ABSTRACT

The invention relates to a prosthetic device for a lower extremity having a prosthetic knee joint having: an upper part, on which a proximal prosthetic component is arranged; a lower part, which is connected to the upper part so as to be pivotable about a knee joint axis; and a distal prosthetic component, on which a prosthetic foot is formed or can be attached, wherein the distal prosthetic component is mounted so as to be displaceable in the direction of the knee joint axis by means of an axial force acting in the longitudinal extent of the distal prosthetic component and a force transmission device is associated with the knee joint, which force transmission device, during the standing phase, converts a displacement or length change of the distal prosthetic component in the direction of the knee joint axis into a flexion moment about the knee joint axis.

20 Claims, 6 Drawing Sheets

(51) Int. Cl.
*A61F 2/66* (2006.01)
*A61F 2/68* (2006.01)
*A61F 2/74* (2006.01)

(52) U.S. Cl.
CPC .............. *A61F 2002/5006* (2013.01); *A61F 2002/5039* (2013.01); *A61F 2002/5072* (2013.01); *A61F 2002/6614* (2013.01); *A61F 2002/6818* (2013.01)

(58) Field of Classification Search
CPC ...... A61F 2002/5072; A61F 2002/6818; A61F 2002/6614; A61F 2/68
See application file for complete search history.

(56) References Cited

U.S. PATENT DOCUMENTS

| | | | | |
|---|---|---|---|---|
| 2009/0143869 | A1* | 6/2009 | Cheng | A61F 2/644 623/39 |
| 2010/0292807 | A1* | 11/2010 | Velez | A61F 2/68 623/44 |
| 2010/0312363 | A1* | 12/2010 | Herr | A61F 2/70 623/39 |
| 2011/0098828 | A1* | 4/2011 | Balboni | A61F 2/60 623/40 |
| 2013/0024006 | A1* | 1/2013 | Balli | A61F 2/70 623/24 |
| 2014/0142722 | A1* | 5/2014 | Liang | A61F 2/38 623/46 |
| 2018/0028390 | A1* | 2/2018 | Dietl | A61F 2/50 |
| 2018/0098864 | A1* | 4/2018 | Auberger | A61H 3/00 |
| 2018/0338844 | A1* | 11/2018 | Hippensteal | A61F 2/68 |

FOREIGN PATENT DOCUMENTS

| | | | |
|---|---|---|---|
| JP | 2009232999 A | 10/2009 | |
| WO | WO-9641599 A1 * | 12/1996 | ............... A61F 2/64 |

* cited by examiner

PROSTHETIC DEVICE

CROSS-REFERENCE TO RELATED APPLICATIONS

This is a national phase application of International Application No. PCT/EP2019/084495, filed 10 Dec. 2019, which claims the benefit of German Patent Application No. 102018133103.7, filed 20 Dec. 2018, the disclosures of which are incorporated, in their entireties, by this reference.

TECHNICAL FIELD

The invention relates to a prosthetic device for a lower extremity, comprising a prosthetic knee joint having an upper part, on which a proximal prosthetic component is arranged, having a lower part, which is connected to the upper part so as to be pivotable about a knee joint axis, and having a distal prosthetic component, on which a prosthetic foot can be secured. The proximal prosthetic component can be in particular in the form of a prosthesis socket which is fastened or fastenable to the prosthetic knee joint via a first connection, which is arranged or formed on the upper part.

BACKGROUND

Prosthetic knee joints replace natural knee joints and permit pivoting of a lower leg part, which predominantly consists of a lower leg tube and a prosthetic foot fastened thereto, relative to the thigh or a thigh part. Prosthetic knee joints are generally secured on a thigh stump. For this purpose, what is referred to as a prosthesis socket is connected to the prosthetic knee joint at a proximal first connection. The prosthesis socket receives the thigh stump and secures the rest of the prosthesis on the patient. For this purpose, the prosthesis socket can be in the form of a rigid socket which is held on the stump or patient via straps or via a vacuum system or what is referred to as a liner system. In principle, other prosthesis socket configurations are also possible.

The simplest form of a prosthetic knee joint is a single-axis prosthetic knee joint which permits free pivoting about a single axis. Furthermore, there are polycentric prosthetic knee joints with which complex relative pivoting movements of the upper part with respect to the lower part can be achieved. The prosthetic knee joint can be assigned damping devices, adjustable end stops, drives, brakes or locking devices in order to adapt to the requirements during use.

In the case of prosthetic knee joints which are not motor-driven, the stance phase flexion is influenced via damping devices or spring devices.

EP 0 439 028 A1 discloses a polycentric prosthetic knee joint, in which a polycentric structure can be pivoted about a pivot axis counter to a spring force or damper force such that it is possible to permit yielding when a load is placed on the heel at the start of the stance phase of walking. For this purpose, the entire polycentric structure is shifted without the polycentric structure being changed in itself.

The flexion counter to a damping resistance and spring resistance in the stance phase is comparatively small and independent of the walking speed. When walking on the flat, there is increasing knee flexion of a human knee joint after contact of the heel as the walking speed increases. Conventional prosthetic knee joints cannot reproduce this effect since, as a walking speed increases, the hip extension moment sharply rises and counters the bending effect.

SUMMARY

It is therefore the object of the present invention to provide a prosthetic device with which walking with less effort is possible.

According to the invention, this object is achieved with a prosthetic device having the features of the main claim. Advantageous refinements of the invention are disclosed in the dependent claims, the description and the figures.

The prosthetic device according to the invention for a lower extremity, comprising a prosthetic knee joint having an upper part, on which a proximal prosthetic component is arranged, a lower part, which is connected to the upper part so as to be pivotable about a knee joint axis, and a distal prosthetic component, on which a prosthetic foot can be secured, makes provision for the distal prosthetic component to be mounted so as to be displaceable in the direction of the knee joint axis by means of an axial force acting in the longitudinal extent of the distal prosthetic component, and the knee joint being assigned a force transmission device which, in the stance phase, converts a displacement of the distal prosthetic component in the direction of the knee joint axis, and thus a length change of the distal prosthetic component, into a flexion moment about the knee joint axis. The longitudinal displaceability of the distal prosthetic component makes it possible to convert an axial force, which acts in the longitudinal direction of said distal prosthetic component, into a flexion moment which acts about the knee joint axis. For this purpose, a force transmission device is assigned both to the knee joint and to the distal prosthetic component and is coupled to both components such that the compressing force, for example during what is referred to as the heel strike, is converted into support of the flexion. The conversion can take place directly, for example via a mechanical force transmission device, which can be in the form of a cable pull, connecting rod or curved path, or via a hydraulic force transmission device which has advantages in respect of force transmissions. Both force transmission devices, both a mechanical and a hydraulic force transmission device, can be provided with a gear device, a deflection device or a transmission element in order to enable force transmission or travel transmission. As a result, directions of force can be deflected, and travel extensions or travel reductions for applying a flexion moment and changes in force or limits can be achieved, which would not be possible without a device arranged between the distal component and the knee joint.

The distal prosthetic component is preferably formed telescopically or mounted displaceably on the lower part in order, during striking or loading in the axial direction of the distal component, to be able to provide a change in length which is then converted into a flexion movement about the knee joint axis.

The distal prosthetic component can be mounted via a spring element so as to be prestressed against a displacement in order, during the swing phase or during static loading, for example when standing, not to carry out any change in length or only a small change in length such that the dimensioning of the spring element makes it possible for a flexion moment to be exerted about the knee joint axis only in certain loading situations. The prestressing of the spring can be adjustable, in particular can be adjustable by motor, in order to be able to undertake an adaptation to the respective situation of use or to the respective requirements of the prosthesis user even during use of the prosthetic device. The prestressing of the spring can also be set to such a high level that an effective change in length is not possible.

It is also possible for a blocking device to be assigned to the distal prosthetic component in order to suppress the longitudinal displaceability and thus the changeability of the length and the application of a flexion moment.

The spring element can offer progressive resistance to a displacement of the distal prosthetic component in the axial direction, as a result of which the maximum flexion moment can be limited.

The knee joint can be assigned an energy storage device for storing flexion energy. The energy storage device can storage energy during the flexing operation and can supply it against to the joint device in order to assist an extension moment. Flexion can thereby be supported by the force transmission device counter to a spring or an energy storage device, with the energy storage device being able to offer progressive resistance to a flexion. Said flexion energy is stored in the energy storage device and can be supplied again to the joint device in order to assist an extension movement. This is expedient in particular during the stance phase extension in order, after the bending of the prosthetic knee joint directly following the heel strike, to facilitate the extension movement and not to have to carry out the latter exclusively by the hip muscles.

In a development of the invention, it is provided that the energy storage device is in the form of a spring element, in particular a spring element having a spring rigidity changing via the knee joint. The spring element can be in the form, for example, of a buckling spring which acts in the extension direction. Particularly during the stance phase flexion, the distance between the force vector of the ground reaction force and the knee joint axis increases. The spring element or the extension spring exhibits increasing flexibility with an increasing flexion angle, i.e. with a decreasing knee angle. The effect achieved by this is that the striking pulse during the heel strike causes the spring element to be compressed or deformed and, as the knee joint increasingly bends, a decreasing restoring force is provided in order to provide a decreasing, or at least not increasing, flexion moment because of the increasing distance between the force vector of the ground reaction force and the knee joint axis. At a large flexion angle, the degressive spring characteristic of the spring element means that greater flexibility in respect of the knee flexion is achieved. If, during walking in the stance phase, the resulting vector of the ground reaction force is shifted again in the direction of the knee axis and in front of the knee axis in the walking direction, the knee joint extends and the extension is assisted by the relaxing spring. The more the knee is extended, the greater is the assisting action of the spring element. Suitable coordination of the spring element enables a shock damping during walking to be realized by the knee flexion, instead of by an axial damper device, without an intentional dissipation of energy by conversion of kinetic energy into heat. The spring characteristic of the spring element can initially increase and can drop again from a certain degree of deformation.

The energy storage device can be assigned an activation and/or deactivation device. It is thereby possible to provide a restoring element and extension support for different movement situations and to eliminate such for other movement situations.

In a development of the invention, it is provided that the knee joint is assigned at least one damper for damping the pivoting movement about the knee joint axis. Alternatively or in addition, it is provided that at least one damper is assigned for damping the displacement movement of the distal prosthetic component in the direction of the joint axis. By damping with the damper, it is possible to provide conventional stance phase damping and/or swing phase damping in addition to flexion support when an axial force occurs. It is thereby possible to influence the prosthetic device in respect of its extension or flexion behavior even during the swing phase. A damper for influencing the displacement movement permits adaptation of the behavior of the flexion support and the manner and the extent of the application of the flexion moment.

The at least one damper is preferably adjustable in order to be able to undertake an adaptation to the respective user behavior or to the requirements of the respective patient. The damper device for damping the pivoting movement about the knee joint axis can be coupled to the damper device for damping the displacement movement. It is likewise possible for the damper for damping the pivoting movement to be coupled to a fluid reservoir in the distal prosthetic component in such a manner that, during a displacement of the distal prosthetic component in the direction of the knee joint axis, hydraulic fluid is conducted into an extension chamber or flexion chamber, depending on which movement is intended to be assisted or which movement is intended to be countered. The supply line can be assigned a switching valve which conducts hydraulic fluid compressed by the displacement movement either into the extension chamber or the flexion chamber, depending on the gait situation or the desired behavior of the prosthetic device.

The knee joint can be assigned a switchable stop or a brake which blocks or brakes a flexion about the knee joint axis. The stop can be activated or deactivated depending on the respective movement phase. If it is recognized via a sensor device that the prosthetic device is in the stance phase, for example via a force sensor in a prosthetic foot, a stop is activated which limits a maximum flexion. Corresponding measures can take place via a brake, via which a flexion movement is braked after a certain knee angle is reached. If the patient with the fitted leg is in the swing phase, which is likewise determined, for example, via a force sensor in the sole of the foot or via another axial force sensor, the flexion stop or the flexion brake is deactivated or released such that a swing phase flexion can take place unhindered or unbraked. Such a flexion stop or a brake can be activated only at a substantially later time, when a maximum flexion angle of approx. 60° is reached, in order to prevent too great a flexion during the swing phase.

A development of the invention makes provision for at least one sensor, in particular for detecting the axial force, the axial force profile, the angular position, the spatial position or the acceleration of at least one component of the prosthetic device, to be coupled to a control device which activates or deactivates a drive of the stop or of the brake.

BRIEF DESCRIPTION OF THE DRAWINGS

Exemplary embodiments of the invention will be explained in more detail below with reference to the attached figures, in which.

DETAILED DESCRIPTION

Figure 1:
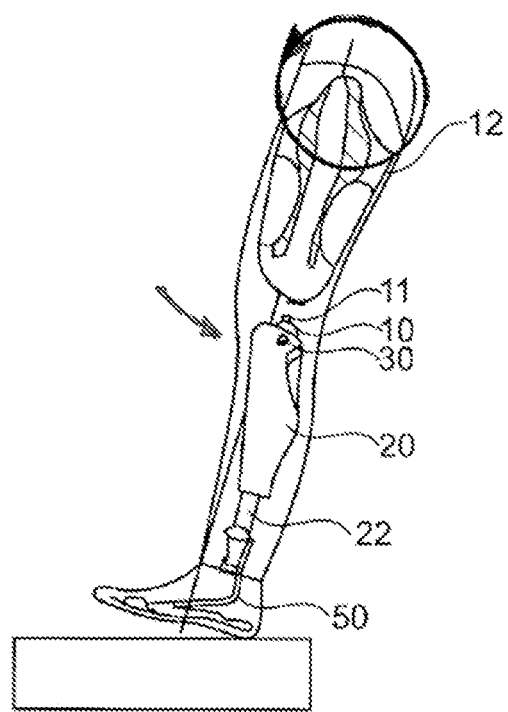
FIG. 1 shows a schematic illustration of a prosthetic device.

FIG. 1, in a schematic illustration, shows a prosthetic device for a lower extremity in the form of a prosthetic leg which has a prosthetic knee joint which has an upper part 10, on which a first proximal connection 11 in the form of a pyramid adapter is arranged. A proximal prosthetic component 12 in the form of a prosthesis socket for receiving a thigh stump can be arranged at the proximal first connection 11. The thigh socket can be secured on the patient's stump via suction socket technology or via other securing mechanisms. A knee joint axis 30 is formed on the upper part 10, about which a lower part 20 of the prosthetic knee joint is pivotably fastened. In the exemplary embodiment illustrated, the lower part 20 is in the form of a receiving frame in which a hydraulic damper device is arranged which is designed to be adjustable in respect of the damping properties during walking. A distal prosthetic component 22 in the form of a lower leg tube is arranged distally with respect to the lower part 20, wherein the lower leg tube likewise has receiving devices for fastening a prosthetic foot 50 to the distal prosthetic component 22.

Prosthetic devices for a lower extremity, comprising a prosthetic knee joint, basically has the same construction if a modular construction is present, i.e. the prosthesis socket 12 is produced separately from the prosthetic knee joint of such and is fastenable thereto via a connection 11. There is also the possibility of the proximal prosthetic component 12 for receiving a prosthetic stump to be formed directly with the upper part 10 such that, in addition to the formation of a pivot axis 30 between the upper part 10 and the lower part 20, the receiving function for the stump is realized at the same time. In addition, there is also the possibility that, instead of a separate prosthetic foot 50, the latter is formed directly on the distal prosthetic component 22 or on the lower leg tube. However, a modular construction has the advantage that the prosthetic device can be produced more cost-effectively and one type of component can be used for a plurality of different users.

When walking on the flat, it is generally necessary, in order to increase the walking speed, to apply an increased hip extension moment, which is illustrated by the upper circle. Said hip extension moment is applied in the stance phase in order to move the center of gravity of the body in front of the respective leg as rapidly as possible. However, said hip extension movement in the stance phase at the same time has a stabilizing effect on the knee joint, that is to say that an extension moment acts about the knee joint axis 30. The action of force is indicated by the frontal arrow. In a human knee joint, at an increased walking speed and an increased hip extension moment via a corresponding muscle movement, increased knee flexion is carried out more or less instinctively during the stance phase. An increased walking speed and an associated increased hip extension moment thus lead to an increased stance phase flexion angle and to an overall "softer" gait. However, in the case of prosthetic devices, an increased hip extension moment has a stabilizing and extending effect on the knee joint, and therefore prosthetic knee joints flex less when the walking speed is increased. This leads to a reduced stance phase flexion and to a non-physiological "harder" gait as the walking speed increases.

Figure 2:
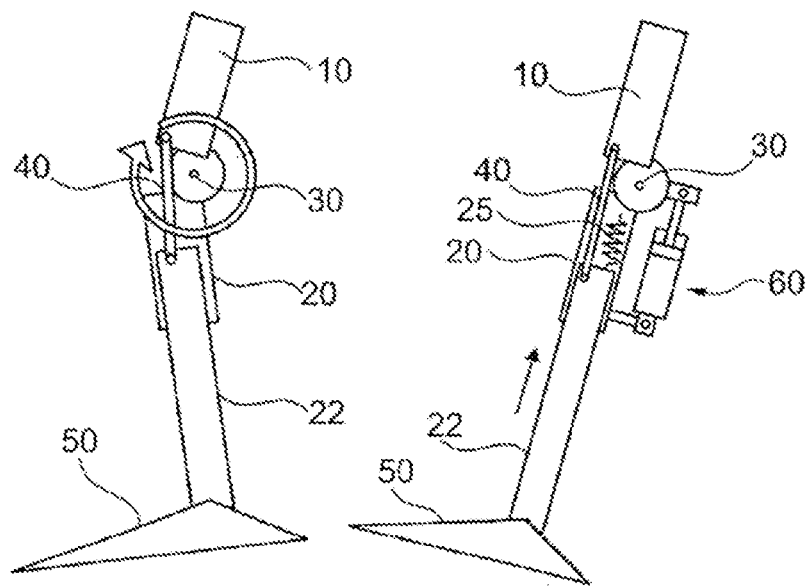
FIG. 2 shows a schematic illustration of a prosthetic device with a force transmission device.

A prosthetic device according to the invention is illustrated schematically in FIG. 2 in two states. In the right-hand state, the prosthetic device is in a maximally extended state directly before the striking on the ground, and, in the left-hand illustration, in a position at the end of the stance phase. Both the upper part 10 and the lower part 20 are illustrated purely schematically, as is the knee joint axis 30 about which the lower part 20 is mounted pivoted relative to the upper part 10. In addition to a monocentric knee joint, a polycentric knee joint can also be arranged or formed between the upper part 10 and the lower part 20. The upper part 10 according to this embodiment can have an adapter or connection means 11 in order to be connected to a separately manufactured prosthesis socket or another proximal prosthetic component 12.

The lower part 20 is likewise only illustrated schematically; there can be other forms of the prosthetic knee joint lower part 20.

Distally with respect to the lower part 20, a distal prosthetic component 22 in the form of a lower leg tube is arranged displaceably in the longitudinal direction of the distal prosthetic component 22. The longitudinal displaceability of the distal prosthetic component 22 relative to the lower part 20 is indicated by the arrow in the direction of the knee joint axis 30. The prosthetic foot 50, illustrated schematically, is fastened to the distal prosthetic component 22.

Between the distal prosthetic component 22 and the upper part 10 there is arranged a force transmission device 40 in the form of a connecting rod which is arranged in an articulated manner both on the upper part 10 and on the distal prosthetic component 22 so as to transmit a tensile force and so as to transmit a compressive force. If the distal prosthetic component 22 is now shifted relative to the lower part 20 in the direction of the knee joint axis 30, a compressive force is transmitted from the distal prosthetic component 22 to the upper part via the force transmission device 40. The coupling point of the force transmission device 40 to the upper part 10 is located in front of the knee joint axis 30 in the walking direction such that the compressive force which is exerted by the prosthetic foot 50 on the upper part 10 via the distal prosthetic component 22 and the force transmission device 40 is converted into a flexion moment which leads to bending, or at least to support of bending, of the prosthetic knee joint about the knee joint axis 30. The left-hand illustration of FIG. 2 shows that the distal prosthetic component 20 has already been pushed into the sleeve-like receptacle in the lower part 20 such that a pivoting movement of the upper part relative to the lower part 20 has been produced via the force transmission device 40 in the form of a connecting rod. The curved arrow indicates the flexion moment and the direction of action of the compressive force applied to the upper part 10 by the force transmission device 40.

In the right-hand illustration of FIG. 2, an energy store in the form of a spring 25 is also arranged between the distal prosthetic component 22 and the lower part 20. The spring 25 can be designed, as illustrated, as a spiral spring or helical spring or as another element absorbing compressive forces and can be compressed during axial loading. If the distal prosthetic component 22 is shifted relative to the lower part 20 in the direction of the knee axis 30 during the heel strike or during the stance phase, the spring element 25 is pre-stressed. As the loading is reduced in the axial direction, for example at the end of the stance phase or in the swing phase, the spring element 25 is relaxed and moves the distal component 22 again into the starting position away from the knee axis 30. This also assists the extension movement of the lower part 20 relative to the upper part since the compressive force of the compressed spring element 25 is converted via the force transmission device 40 into an extension movement of the lower part 20.

A damper 60 is illustrated schematically on the rear side of the prosthetic device. The damper 60 can also be arranged inside the lower part 20 in combination with the spring element 25. It is possible via the damper 60 to influence the axial shifting of the distal prosthetic component 22. The damper 60 is advantageously adjustable in order thereby to influence the shifting behavior during compression and during relaxing of the spring element 25. Via this change in the manner of behavior of the relaxing and/or the compression, the flexion support and the extension movement as load is relieved are also influenced at the same time. The spring element 25 can also be arranged in the damper device 60 externally outside the lower part 20.

Figure 3:
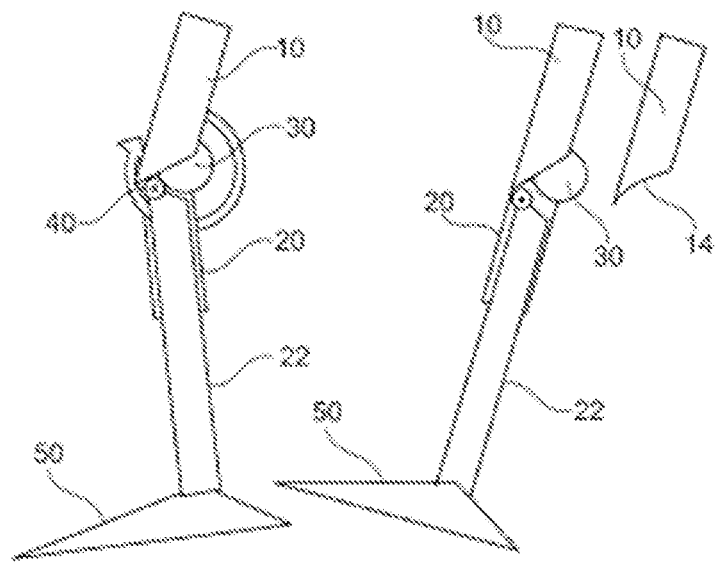
FIG. 3-5 show variants of FIG. 2.

A variant of the force transmission device 40 is illustrated in FIG. 3. The basic construction of the prosthetic device corresponds to that of FIG. 2. Instead of a connecting rod, the force transmission device 40 in the exemplary embodiment of FIG. 3 is configured as a curved path. In the exemplary embodiment illustrated, the force transmission device 40 is in the form of a roller which is arranged at the proximal end of the distal prosthetic component 22. Contact with a running surface 14 or a sliding surface 14 on the distal end side of the upper part 10 or on a correspondingly arranged running surface 14 or sliding surface 14 is exerted via the roller 40 or via a sliding body. The right-hand illustration of FIG. 3 shows two different contours of running surfaces or sliding surfaces 14, the left-hand contour is rectilinear, and the right-hand contour has a curved profile. If the distal prosthetic component 22 is displaced in the direction of the knee joint axis 30 relative to the lower part 20, the force transmission device 40 slides or rolls on the sliding or running surface 14. The contact point between the force transmission device 40 and the running surface 14 or sliding surface 14 is located here in front of the knee joint axis 30 such that, during striking and a relative shifting of the distal prosthetic component 22 in the direction of the knee joint axis 30, a force is exerted on the upper part 10, leading to a flexion moment about the knee joint axis 30. A position in which bending has already taken place because the distal prosthetic component 22 has slid into the lower part 20 is shown in the left-hand illustration of FIG. 3.

Figure 4:
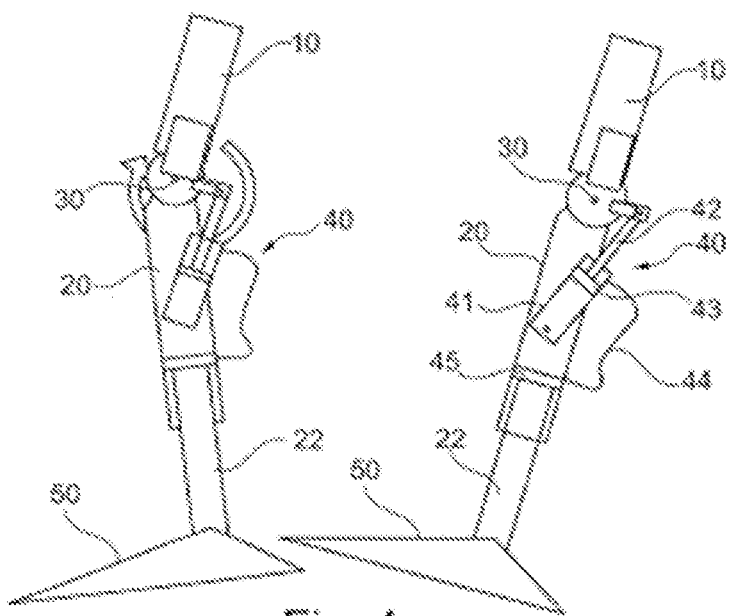

In FIG. 4, instead of a pure mechanical coupling between the distal prosthetic component 22 and the upper part 10, a hydraulic force transmission device 40 is shown. The distal prosthetic component 22 is mounted in a longitudinally displaceable manner inside the lower part 20 and can be shifted in the direction of the knee joint axis 30 during loading, for example during the striking during walking. As in the other exemplary embodiments, the shifting travel is limited to a length which is not unpleasant for a prosthetic user. A customary shifting travel between 1 cm and 3 cm is generally acceptable for a prosthesis wearer. The hydraulic force transmission device 40 has a hydraulic actuator with a housing 41 which is mounted on the lower part 20. A moveable hydraulic piston 43 is coupled with a jib to the upper part 10 via a piston rod 42. The hydraulic cylinder 41 is coupled via a hydraulic line 44 to a pressure chamber 45 which is compressible. It is basically also possible for the pressure chamber 45 to have a piston mounted moveably therein. Alternatively, the pressure chamber 45 is composed of a compressible material, for example an elastic plastic. The pressure chamber 45 is then designed as a type of buffer which is coupled hydraulically to the hydraulic cylinder via the hydraulic line 44. If a force is exerted on the distal prosthetic component 22, for example during the striking, the pressure chamber 45 compresses and hydraulic fluid is pumped through the hydraulic line 44 into the housing 41. The hydraulic piston 43 is thereby shifted in the proximal direction toward the prosthetic foot 50. Owing to the coupling of the piston rod 42 to a jib, which faces rearward in the walking direction, on the upper part 10, retraction of the piston 43 into the housing 41 causes a flexion movement and bending of the upper part relative to the lower part about the knee joint axis 30. Such a compressed position both of the pressure chamber 45 and also a flexed position of the prosthetic device are shown in the left-hand illustration. If the prosthetic foot 50 is relieved of load, for example a swing phase is initiated, the hydraulic fluid can be sucked out of the cylinder 41 through the line 44 into the pressure chamber 45 by elastic restoring forces which can be applied by a correspondingly elastic configuration of the pressure chamber 45, as a result of which the movement is reversed and an extension assisted. In order to assist the extension at the end of the stance phase or during the swing phase, in the case of a mechanical coupling according to FIGS. 2 and 3 shifting can also take place counter to a spring force such that the distal prosthetic component 22 is shifted counter to a spring inside the lower part 20. When an axial loading in the direction of the knee joint axis 30 ceases, a reverse of the movement will arise, which assists an extension movement. As an alternative to an elastic mounting of the distal prosthetic component 22, the upper part 10 can also be pre-stressed relative to the lower part 20 via an elastic element counter to a flexion movement.

In an alternative configuration of the embodiment according to FIG. 4, instead of a rearward arrangement of the piston rod 42 on a jib, the piston rod 42 can also be extended out of the cylinder 41 by means of corresponding hydraulic circuitry such that the coupling can take place frontally, i.e. in front of the knee joint axis in the walking direction. By means of the hydraulic transmission of the compression movement between the distal prosthetic component 22 and the lower part 20, force and travel transmission can be realized in a simple manner, for example by varying the piston diameters.

Figure 5:
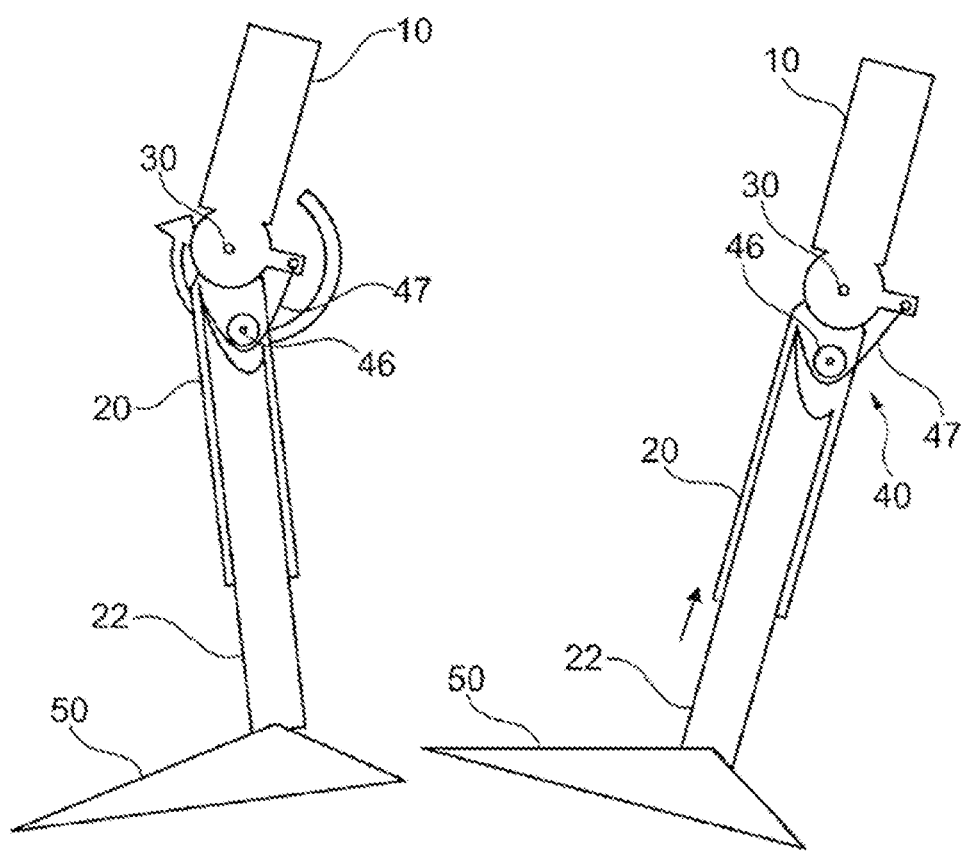

A further embodiment of the invention is illustrated in FIG. 5 in which the force transmission device 40 is in the form of a cable pull which is arranged on the distal prosthetic component 22, which is mounted displaceable inside the lower part 20. In the exemplary embodiment, the force transmission device 40 is provided with a cable 47 which is fastened to a frontal proximal end of the distal prosthetic component 22. Via a deflection device 46, for example a roller or a pin, the cable 47 is guided to a lever, which projects to the rear in the walking direction, on the upper part 10. If the lower part 20 is shifted relative to the distal prosthetic component 22, the proximal end of the distal prosthetic component 22 is moved upward, the cable 47 is pulled downward because of the deflection roller 46, thus resulting in flexion and in an application of a flexion moment about the knee joint axis 30.

Figure 6:
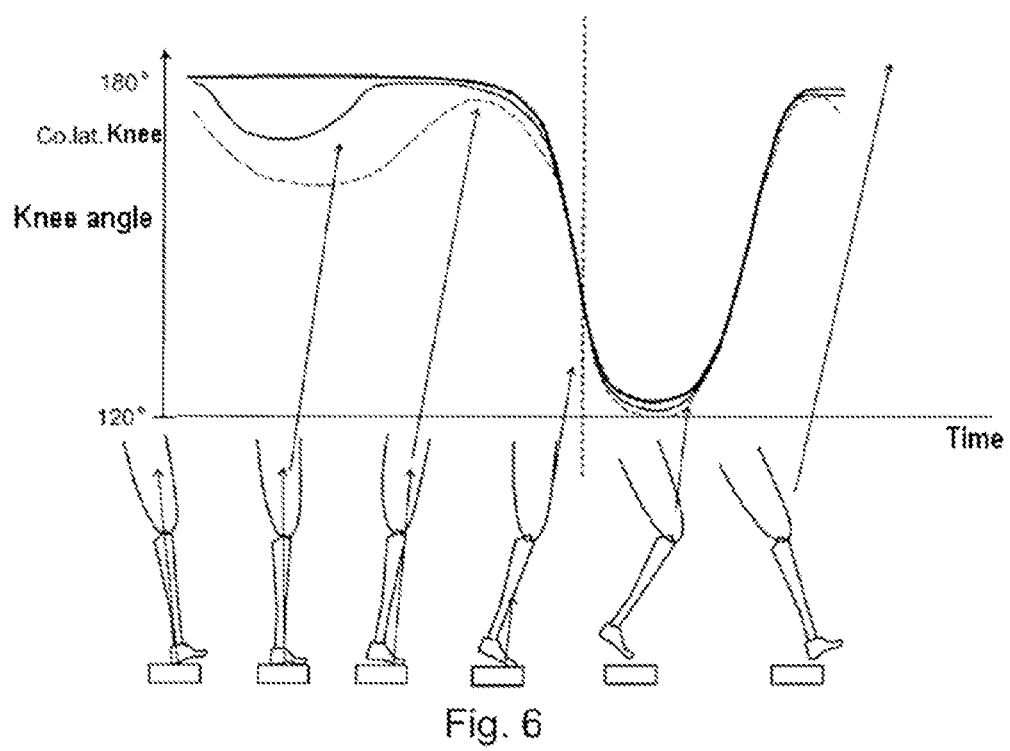
FIG. 6 shows different knee angle profiles.

FIG. 6 shows schematic knee angle profiles over time during walking. The upper profile shows the knee angle profile with a prosthetic device without stance phase dynamics, in which there is a virtually extended prosthetic knee joint at a knee angle of 180° from the heel strike, which is illustrated on the very left, to shortly before the end of the stance phase, which is illustrated by the dashed, vertical line in the diagram. The lower knee angle curve shows a contralateral knee, i.e. an intact human knee joint with a corresponding angle profile. The middle curve shows an exemplary profile of a stance phase flexion support with the prosthetic knee joint according to the invention, from which it can be seen that an approximately natural knee angle curve can be achieved during walking.

Figure 7:
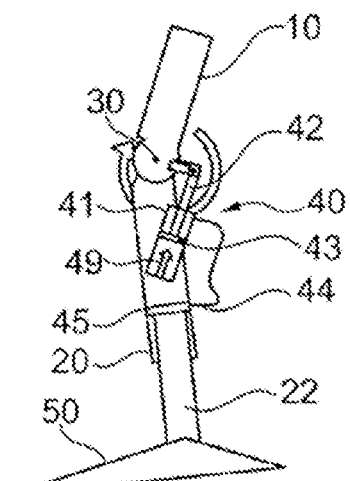
FIG. 7 shows a variant of FIG. 2 with an energy store.

FIG. 7 shows a further variant of the invention in which an energy storage device 49 is additionally arranged inside the force transmission device 40 and acts within the housing 41 on the hydraulic piston 43. The energy storage device 49 stores flexion energy, i.e. the same energy which is necessary for applying a flexion moment about the knee joint axis 30. The spring 25 can have prestressing which is preferably only of a size such that the desired knee flexion can be initiated via the force transmission device 40 during each heel strike. The energy storage device 49 thus provides a smaller resistance against a flexion than a flexion moment applied via the force transmission device 40.

As an alternative to the arrangement in the force transmission device 40, the energy storage device 49 can be arranged outside the force transmission device 40, for example as a bending spring or buckling spring between the upper part 10 and the lower part 20. In this refinement, the energy storage device 49 preferably has a spring rigidity which changes over the knee angle. In particular as a flexion angle increases, i.e. as a knee angle α decreases, the flexion resistance by the energy storage device 49 is reduced.

Figure 8:
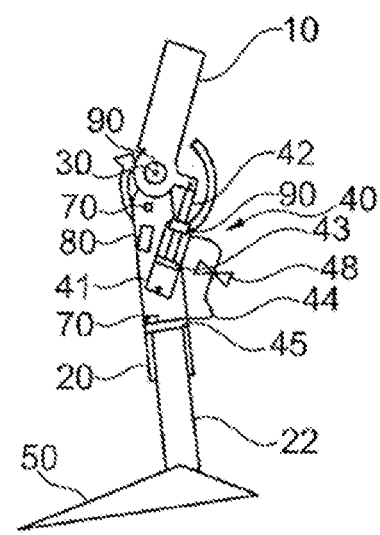
FIG. 8 shows a variant of FIG. 2 with sensors.

FIG. 8 illustrates a further variant of the invention in which a switchable or adjustable valve 48 is arranged in the hydraulic line 44 between the extension chamber and the flexion chamber, and therefore the flow rate from the pressure chamber 45 into the flexion chamber can be influenced. The valve 48 acts as a damper which influences the displacement movement of the distal prosthetic component 22 relative to the lower part 20. By means of an adjustable configuration of the valve 48, for example by motor or manually, adaptation to the respective patient or the respective intended use is possible. The damper 60 according to FIG. 2 can also be adjustable, for example by changing valve positions in a line from the extension chamber into the flexion chamber.

FIG. 8 also shows a sensor 70 which can be designed for detecting the axial force, the axial force profile or accelerations. Instead of detecting axial forces or axial force profiles, the sensor 70 can also be designed for detecting spatial positions and/or accelerations of the lower part 20. With a different arrangement of the sensor 70, the corresponding variables can be detected for the distal prosthetic component 22. A further sensor 70 can be arranged on the lower part 20 or on the upper part 10 for detecting angular positions of the upper part 10 relative to the lower part 20; in the embodiment illustrated, the angle sensor 70 is arranged on the lower part 20. The sensors 70 are coupled to a control device 80 which, in turn, activates a drive for the throttle 48 or the valve 48.

A switchable brake 90 which is coupled to the control device 80 is arranged at the upper end of the housing 41 of the force transmission device 40. When bending is achieved in accordance with axial forces or during the course of the gait, it is possible to activate or to deactivate the brake 90. With activation of the brake 90, it is also possible to set an extension stop and a maximum flexion angle in a variable or else permanent way. If, for example, an extension stop is reached at a knee angle of 187°, as measured on the rear side of the prosthetic device, the brake 90 stops a further movement, and, correspondingly, when a maximum flexion angle is reached, the further flexion is stopped by the brake 90 being activated. Alternatively or additionally, a brake 90 or an adjustable stop can be arranged and formed about the knee joint axis 30.

Figure 9:
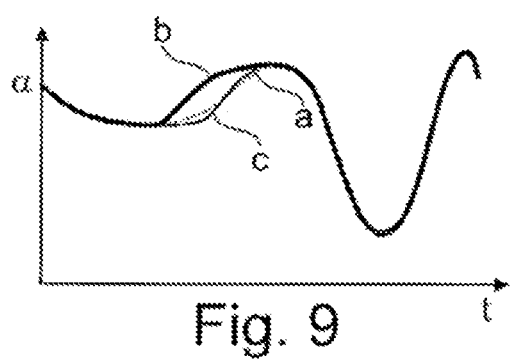
FIG. 9 shows knee angle profiles for different supports of the extension.

FIG. 9 shows three different knee angle profiles over time. The three knee joint profiles differ essentially in the region of the stance phase flexion. The knee angle profile of curve a corresponds to the customary knee angle profile for a sound and intact leg. The knee angle profile b represents a short flexion phase in which the stance phase flexion is reduced in time and an extended leg is very rapidly present following the heel strike and the first stance phase flexion. Such a knee angle profile can be achieved, for example, by means of a powerful energy storage device 49 via the spring element for storing flexion energy, the spring element providing flexion support. The third knee angle curve c provides a delayed extension, in which the knee angle α within the stance phase flexion remains reduced for a longer period of time compared with the knee angle curve a of a sound leg. Accordingly, in order to reach the maximum extension angle in the stance phase, the more rapid extension is initiated than in the case of a natural joint.

Figure 10:
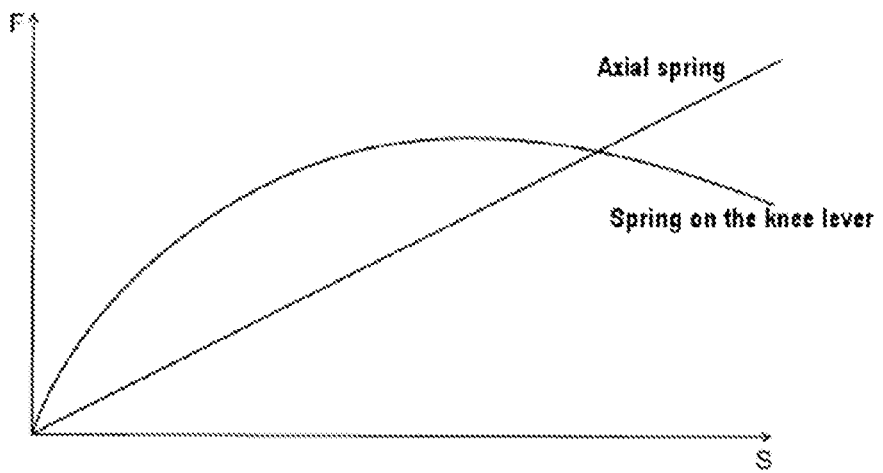
FIG. 10 shows illustrations of spring characteristics.

FIG. 10 shows an illustration of two spring characteristics which can be used in the prosthetic device. The spring which is attached to a knee lever serves for influencing the flexion or extension of the lower part 20 relative to the upper part 10. In the embodiment illustrated, said spring via the deformation travel s, i.e. as a knee angle α decreases, initially has a rise in the spring rigidity up to a maximum value, and then, upon further bending or deformation of the spring element, only a smaller resistance is provided such that a decreasing spring characteristic arises. This is a possible knee profile, for example, with a bending spring between the upper part 10 and the lower part 20. An alternative spring characteristic is a linear spring characteristic which, as the deformation increases, provides an increasing resistance force; such a spring can be used, for example, as a spring element 25 against an axial shifting of the distal prosthetic component 22 relative to the lower part 20.

The invention claimed is:

1. A prosthetic device for a lower extremity, comprising a prosthetic knee joint having an upper part, on which a proximal prosthetic component is arranged, a lower part, which is connected to the upper part so to be pivotable about a knee joint axis, and a distal prosthetic component, on which a prosthetic foot is formed or can be secured, characterized in that the distal prosthetic component is mounted so as to be linearly and longitudinally displaceable in the direction of the knee joint axis by means of an axial force acting in the longitudinal extent of the distal prosthetic component, and the knee joint is assigned a force transmission device which, in the stance phase, converts the linear and longitudinal displacement of the distal prosthetic component in the direction of the knee joint axis into a flexion moment about the knee joint axis.

2. The prosthetic device according to claim 1, wherein the distal prosthetic component is formed telescopically on the lower part or mounted displaceably on the lower part.

3. The prosthetic device according to claim 1, wherein the force transmission device is in the form of a mechanical or hydraulic force transmission device.

4. The prosthetic device according to claim 3, wherein the distal prosthetic component is mounted via a spring element so as to be prestressed against a displacement.

5. The prosthetic device according to claim 4, wherein the spring element offers progressive resistance to the displacement.

6. The prosthetic device according to claim 1, wherein the knee joint is assigned an energy storage device for storing flexion energy.

7. The prosthetic device according to claim 6, wherein the energy storage device is in the form of a spring element having a spring rigidity changing via the knee angle.

8. The prosthetic device according to claim 6, wherein the energy storage device is assigned an activation and deactivation device.

9. The prosthetic device according to claim 1, wherein the knee joint is assigned at least one damper for damping the pivoting movement about the knee joint axis and/or the displacement movement.

10. The prosthetic device according to claim 9, wherein the at least one damper is adjustable.

11. The prosthetic device according to claim 1, wherein the knee joint is assigned a throttle or a brake which blocks/brakes the flexion moment about the knee joint axis.

12. The prosthetic device according to claim 11, wherein a sensor is coupled to a control device which activates or deactivates a drive of the throttle or of the brake.

13. A prosthetic device for a lower extremity, the prosthetic device comprising:
    a prosthetic knee joint having an upper part on which a proximal prosthetic component is arranged;
    a lower part which is connected to the upper part so to be pivotable about a knee joint axis; and
    a distal prosthetic component formed telescopically on the lower part or mounted displaceably on the lower part, on which a prosthetic foot is formed or can be secured;
    wherein the distal prosthetic component is mounted so as to be linearly and longitudinally displaceable in the direction of the knee joint axis by means of an axial force acting in the longitudinal extent of the distal prosthetic component, and wherein the knee joint is assigned a force transmission device in the form of a mechanical or hydraulic force transmission device which, in the stance phase, converts the linear and longitudinal displacement of the distal prosthetic component in the direction of the knee joint axis into a flexion moment about the knee joint axis.

14. The prosthetic device according to claim 13, wherein the distal prosthetic component is mounted via a spring element so as to be prestressed against the displacement.

15. The prosthetic device according to claim 14, wherein the spring element offers progressive resistance to the displacement.

16. The prosthetic device according to claim 13, wherein the knee joint is assigned an energy storage device for storing flexion energy.

17. The prosthetic device according to claim 16, wherein the energy storage device is in the form of a spring element having a spring rigidity changing via the knee angle.

18. The prosthetic device according to claim 16, wherein the energy storage device is assigned an activation and deactivation device.

19. The prosthetic device according to claim 13, wherein the knee joint is assigned at least one damper for damping the pivoting movement about the knee joint axis and/or the displacement movement.

20. A prosthetic device for a lower extremity, the prosthetic device comprising:
    a prosthetic knee joint having an upper part on which a proximal prosthetic component is arranged;
    a lower part which is connected to the upper part so to be pivotable about a knee joint axis;
    a distal prosthetic component formed telescopically on the lower part or mounted displaceably on the lower part, on which a prosthetic foot is formed or can be secured; and
    an energy storage device assigned to the knee joint for storing flexion energy;
    wherein the distal prosthetic component is mounted via a spring element so as to be prestressed against a displacement, and so as to be linearly and longitudinally displaceable in the direction of the knee joint axis by means of an axial force acting in the longitudinal extent of the distal prosthetic component, and wherein the knee joint is assigned a force transmission device in the form of a mechanical or hydraulic force transmission device which, in the stance phase, converts the linear and longitudinal displacement of the distal prosthetic component in the direction of the knee joint axis into a flexion moment about the knee joint axis.

* * * * *